Oct. 11, 1932.  A. C. STEVENS  1,882,372

VALVE

Filed Sept. 13, 1928

Inventor:
Arthur C. Stevens.
by Monroe E. Miller
Attorney

Patented Oct. 11, 1932

1,882,372

UNITED STATES PATENT OFFICE

ARTHUR CHARLES STEVENS, OF SHINFIELD, NEAR READING, ENGLAND

VALVE

Application filed September 13, 1928, Serial No. 306,101, and in Great Britain October 18, 1927.

This invention has reference to valves and in particular refers to valves for controlling the supply of petrol from the petrol tank to the carburettor of a motor car, the object being to provide means whereby the valve spindle is so locked or held either in its closed or open position, as to render it impossible for said spindle to be moved until the mechanism that holds it has been released by the insertion of a key.

According to this invention I form the outer end of the spindle or movable part of the valve with locking mechanism similar to the movable part provided in what is known as a cylinder latch, that is with a number of holes in each of which a peg fits loosely, said pegs projecting into a slot provided for the insertion of a key, but instead of having only one corresponding set of spring controlled pegs in the stationary part of the locking mechanism I provide two corresponding sets of spring controlled pegs. These spring controlled pegs are arranged so that the one set locks the valve spindle when in its closed position, and the other set of spring controlled pegs locks it in its open position, a stop being provided to limit the movement of the spindle to these two positions.

In order that the invention may be clearly understood I have appended the accompanying drawing.

A represents the body of the valve, B the valve plug, $b'$ the projection or spindle by which said plug B is operated, D the valve spindle, E the lock case or body in which the locking mechanism is contained, and F the cap or cover which encloses the lock case.

According to this invention the valve spindle D is formed with a slot $d'$ in which a key fits, and also with a number of holes. Fitting in each of these holes is a peg $d^2$ which pegs $d^2$ project into said slot $d'$ so that when the correct key is inserted into said slot it causes the pegs $d^2$ which form part of the locking mechanism, to force the spring controlled pegs $d^3$, located in holes in the lock case or body E, out of engagement with said spindle D, thereby permitting the spindle to be operated and the valve plug B, which is connected to said spindle by the projection $b'$ to be moved.

Figure 2:
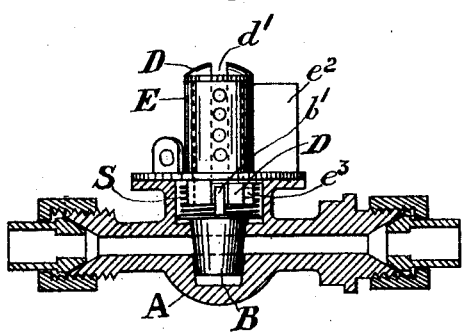
Fig. 2 is a part sectional view of Fig. 1 with the cover of the locking portion removed.
Figure 5:
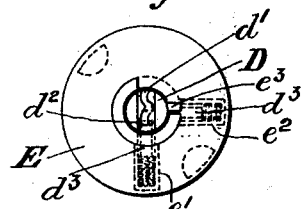
Fig. 5 is an inverted plan view of the locking portion and valve spindle.

Now in order to lock the spindle when the valve plug B, which is held on its seating by the coiled spring S interposed between the cover plate and the flange $g$ formed on the valve plug, is in either its open or closed position I provide two corresponding sets of springs controlled pegs or pins $d^3$, the set which locks the valve spindle in its closed position being shown located in holes in the part $e'$ of the lock case or body (see Fig. 5) and the set which locks said valve spindle in its open position being shown in the part $e^2$ of said lock case or body, the movement of said spindle being limited to these two positions by the stop $e^3$, as clearly shown by Figs. 2 and 5.

Figure 1:
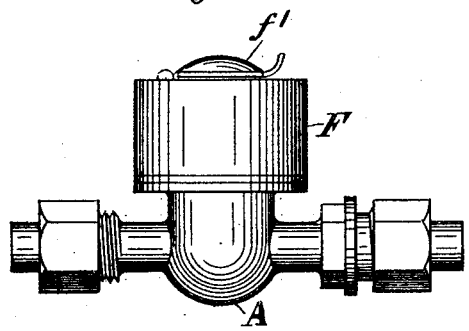
Fig. 1 is a longitudinal view of the valve.
Figure 3:
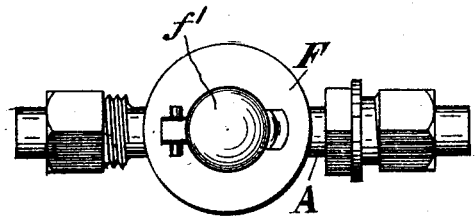
Fig. 3 is a plan view of Fig. 1.
Figure 4:
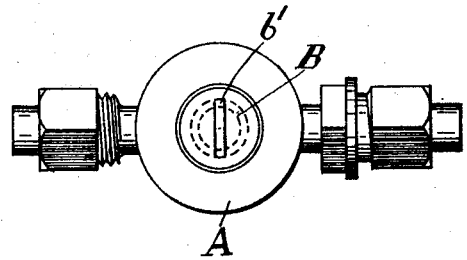
Fig. 4 is a plan view of the valve with the locking portion removed.

The cover F which encloses the lock case E has a spring controlled hinged cap $f'$ fitted over the opening provided for the insertion of the key to prevent dust or dirt entering the slot or key way $d'$ as clearly shown by Figs. 1 and 3.

It will be readily understood on inserting the particular key suitable for operating or lifting the pegs $d^2$ in the spindle D and consequently the spring controlled pegs $d^3$ in the body E, that said spindle D can be turned into one or the other of its positions, and on withdrawing the key that such spindle will be locked or held in the position in which it then assumes. The plug B is provided with a flange against which the inner end of the spring S is adapted to bear.

What I claim as my invention and desire to secure by Letters Patent is:—

A lock valve comprising a valve body having a chamber therein, a cover plate seated on the valve body above said chamber and having an opening therein communicating with the chamber, a lock cylinder having a plurality of spring pressed tumblers and having its inner end extending through said plate and into said chamber and also having a recess therein, a plug mounted in said valve body and having a projection adapted to be received in the recess in the lock cylinder, the inner end of said lock cylinder having a smaller diameter than the interior diameter of the chamber, a spring surrounding the inner end of the lock cylinder and adapted to bear against the upper portion of the plug and against the lower face of the cover plate.

In testimony whereof I have signed my name to this specification.

ARTHUR CHARLES STEVENS.